UNITED STATES PATENT OFFICE 2,495,245

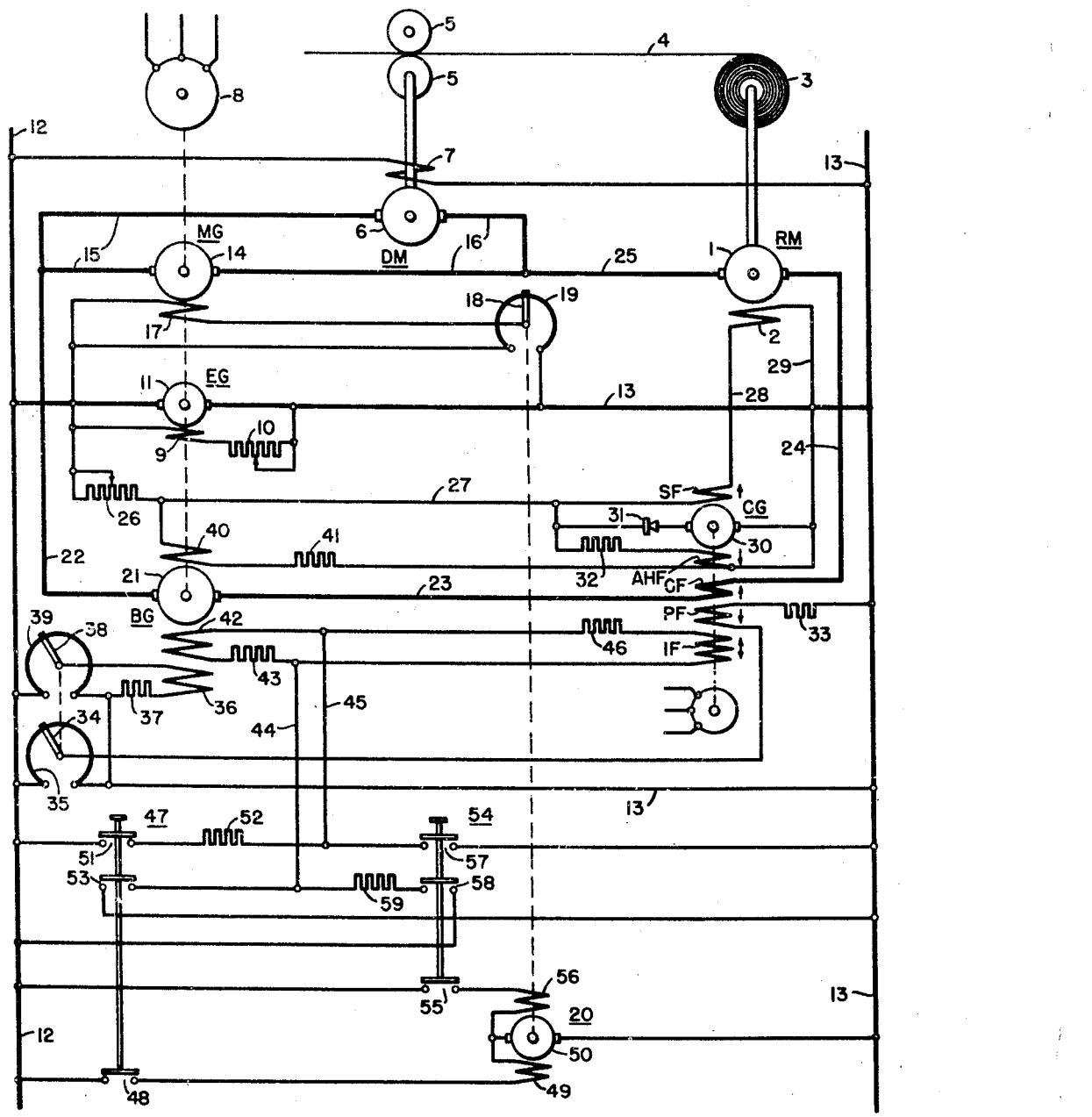

CORE TYPE REEL DRIVE

Martin H. Fisher and Vincent B. Baker, Pittsburgh, Pa., assignors to Westinghouse Electric Corporation, East Pittsburgh, Pa., a corporation of Pennsylvania Application September 11, 1948, Serial No. 48,894

6 Claims. (Cl. 318—530)

This invention relates to electrical motor controls and in particular to a control for maintaining substantially constant power output of a motor as its speed is changed by load conditions.

When sheet material is to be wound onto reels as it is delivered at a constant rate from a processing operation, it is necessary that the speed of the motor driving the reel decrease as the reel diameter increases according to the material accumulated thereon. It is furthermore desirable that the torque of the motor increase at the same time so that substantially constant tension is maintained in the material being wound. If exactly constant tension and speed is maintained in the strip being wound, the power required from the motor also remains constant.

If the armature voltage and current of a direct current motor are maintained constant the power delivered by the motor remains constant even though the speed and field strength are varied. To maintain constant armature voltage, the product of speed and field strength must be constant, i. e., the field strength must be inversely proportional to the speed of the motor. Control circuits have been constructed to operate on this principle. For protection against the overspeed, the known control circuits require a special motor with at least two field windings, one of which is controlled according to the armature current of the motor while the other field winding is constantly excited to establish a fixed minimum field strength and thus a fixed maximum speed for the motor. Means were also provided to prevent reversal of the controlled field which would lead to excessive weakening of the field flux in the motor and overspeeding.

The principal object of this invention is to provide control equipment that is suitable for use with a conventional direct current motor having a single field winding assembly and that serves to maintain the power output of the motor constant with changes in speed.

Another object of the invention is to provide control equipment that automatically operates a direct current motor at constant power output over a selected speed range and at constant speed should the power requirements of the driven load fall below the selected constant power output.

These and other objects of the invention are apparent from the following description of a preferred form of the invention.

According to the invention, the power output of a direct current motor, the speed of which is governed by load conditions, is maintained at a selected value with variations in speed by so regulating the field current of the motor that its armature current remains at a selected substantially constant value. In the control equipment, the armature current of the motor is compared with a reference current and the differences, after amplification, is employed to regulate the motor field current while current from a constant-voltage source flowing through the same motor field winding establishes a minimum field to limit the no-load speed of the motor.

An embodiment of control equipment according to the invention is schematically illustrated in the accompanying drawing.

According to the drawing, a reel drive motor RM having an armature 1 and a field winding 2 is employed to drive a reel 3 upon which strip material 4 is wound. The strip material is drawn from processing equipment by a pair of rolls 5 one of which is driven by a roll drive motor DM. The roll drive motor DM which may be similar to the reel drive motor RM has an armature 6 and a field winding 7.

The drive motor DM and the reel motor RM are electrically energized by a main generator MG which is driven by an alternating current motor 8. The motor 8 also drives an exciter generator EG and a booster generator BG. The exciter generator EG is self excited having its field winding 9 and field rheostat 10 connected in shunt with its armature 11. The positive terminal of the exciter generator EG is connected to a positive control bus 12 and its negative terminal is connected to a negative control bus 13.

The field winding 7 of the drive motor DM is connected between the control buses 12 and 13 to maintain constant field flux in the motor.

The main generator MG has its armature 14 connected in a loop circuit including power leads 15 and 16 and the armature 6 of the drive motor DM and has its field winding 17 connected between the positive control bus 12 and a movable contact 18 of a potentiometer rheostat 19 connected between the control buses 12 and 13. The potentiometer rheostat 19 serves as a speed control means for the motor DM since this rheostat, by varying the field strength of the generator, varies the voltage applied to the armature 6 of the motor DM.

The movable contact 18 of rheostat 19 is mechanically driven by a speed-change motor 20 rather than being manually adjustable so that substantially constant rates of acceleration and deceleration are maintained during changes in speed of the drive motor DM. As long as the acceleration or deceleration is substantially constant, it is relatively easy to compensate for the inertia of the reel motor armature and maintain constant power output during speed changes.

To correlate the speeds of the drive motor DM and the reel motor RM, the latter is also energized from the main generator MG. Thus a change in output voltage of the main generator MG effects corresponding changes in the speed of both motors.

The booster generator BG has its armature 21 connected in the armature loop circuit of the reel motor RM and is controlled so that its output voltage overcomes the resistance drop of the loop circuit including the reel motor armature 1. This loop circuit may be traced from the power lead 15 connected to the main generator armature 14, through a power lead 22, the armature 21 of the booster generator BG, a power lead 23, a current field winding CF of a motor driven control generator CG, a power lead 24, the armature 1 of the reel motor RM, and a lead 25 connected to the other side of the main generator armature 14.

The field winding 2 of the reel motor RM has two sources of field current supply. The exciter generator EG serves as a first source of constant voltage. The current flows from the positive control bus 12 through a field rheostat 26, a lead 27, a self-energizing field winding SF of the control generator CG, a lead 28, the field winding 2 of the reel motor RM, and a lead 29 connected to the negative control bus 13.

The control generator CG serves as the second source of field current for the field winding 2 of the reel motor RM. This generator has one terminal of its armature 30 connected to the negative bus 13 and its other terminal connected through a rectifier 31 to the lead 27. The rectifier 31 is included so that under no circumstance may the control generator CG reduce the field excitation of the reel motor RM below the value set by the current flowing through the field rheostat 26. The control generator CG serves to increase the field current should the armature current of the reel motor RM tend to exceed the selected value.

In addition to the current measuring field winding CF and the self-energizing field winding SF, the control generator CG has a reference or pattern field winding PF, an inertia compensating field winding IF and an antihunt field winding AHF. The antihunt field winding AHF, in series with a tuning resistor 32, is connected between the lead 27 and the negative control bus 13. In this arrangement the antihunt field winding AHF, in series with the resistor 32, is effectively in parallel with the series combination of the self-energizing winding SF and the field winding 2 of the reel motor RM with both branches of the circuit connected between the lead 27 and the negative bus 13. The tuning resistor 32 is adjusted so that under steady state conditions the ampere turns of the antihunt field winding AHF are less than the ampere turns of the self-energizing field winding SF. These windings are connected in opposition and the difference in ampere turns is preferably just sufficient to maintain the generated voltage of the control generator CG at any value along the substantially linear portion of the saturation characteristic of the generator CG so that the other field windings of this generator are only called upon to provide the slight additional or subtractive net field needed to shift the armature voltage of generator CG to a higher or lower value. Thus, the control generator operates as a sensitive amplifier of a high amplification ratio. Because of the inductance of the reel motor field winding 2, the time constant of the antihunt field winding branch of the circuit is very much less than the time constant of the self-energizing field winding circuit. As a result of this difference in time constants, the antihunt field winding AHF rapidly follows any change in output voltage and acting in advance of the self-energizing field winding SF opposes any sudden change in the output voltage of the control generator CG.

The reference or pattern field winding PF of the control generator CG, in series with a resistor 33, is connected between the negative control bus 13 and a movable contact 34 of a tension control potentiometer 35. The potentiometric tension control rheostat 35 is connected between the control buses 12 and 13 and is adjusted to establish in the pattern field winding PF a current that is proportional to the armature current to be maintained in the reel motor RM. The pattern field winding PF is arranged to reduce the field excitation of the control generator CG and thus the field excitation of the reel motor RM so that the reel motor draws more armature current. The armature current of the reel motor RM increases until the strength of the current measuring field winding CF, which tends to increase the output voltage of the control generator CG, equals the strength of the pattern field. Any lack of balance between these field strengths energizes the control generator in such direction as to reduce the difference between the selected armature current and that current actually flowing.

As mentioned, the control generator CG constitutes a second source of field current to supplement the constant-voltage source; and it will now be recognized that generator CG, through the action of the current measuring field winding CF, controls the excitation of the reel motor RM according to the strength of the motor armature current.

The booster generator BG which serves to overcome the resistance loss in the armature loop circuit of the reel motor RM has three field windings. The first of these windings, a winding 36, is connected in series with a resistor 37 between the negative control bus 13 and a movable contact arm 38 of a potentiometer 39. The potentiometer rheostat 39 is connected between the control buses 12 and 13. The movable contact arm 34 of the tension control rheostat 35 and the contact arm 38 of rheostat 39 are mechanically interconnected for single knob control. This is preferable from a performance standpoint because these controls must be adjusted together, the tension control rheostat 35 to select the armature current to be maintained, the rheostat 39 to energize the booster generator BG until its output voltage equals the resistance loss in the armature loop circuit. Since these effects are linear, the rheostat slides can be mechanically connected together for best operation and simplicity of control.

A second field winding 40 of the booster generator BG, poled differentially to the first winding 36 and having relatively few ampere turns, is connected in series with a resistance 41 between the lead 27 and the negative control bus 13. Field winding 40, energized from the same source as the motor field winding 2, thus reduces the booster excitation as the excitation of the reel motor RM is increased. This during running conditions, tends to slightly reduce the tension as the reel diameter increases. This result follows because a reduction in booster voltage requires an equal drop in generated voltage in the reel motor RM to maintain the selected armature current. Since the speed of the motor is determined by the strip material being wound the drop in generator voltage must come from a weakening of the field excitation. But the decrease in field excitation results in less torque per unit of armature current, hence in a decrease in tension with decrease in booster voltage.

The differentially connected booster field 40 is required, if a satisfactory "stalled tension" is to be maintained when the reel motor RM is at standstill. As long as the reel motor RM is running and winding material on the reel any change in field excitation is reflected in a change in armature current which the control generator CG can sense and use in adjusting the excitation of the motor field winding 2. At standstill there is no voltage generated in the reel motor RM, therefore no change in armature current with changes in field excitation. Since the control generator CG is extremely sensitive to differences in ampere turns between the pattern field winding PF and the current measuring field winding CF, and since at standstill the pattern field ampere turns are controlled by the potentiometer rheostat 35 while the armature current is determined entirely by the booster generator BG, it is practically impossible to adjust all the circuits to secure the proper output voltage from the control generator CG. This difficulty is solved by the weak differentially connected field 40 of the booster generator. This field, which serves to reduce the voltage in the armature loop circuit with an increase in reel motor excitation thus produces the same effect on the armature current as does the change in motor field excitation when the motor is running and enables the control generator CG to regulate the armature current and to maintain a selected stalled tension in the strip material.

Substantially constant tension may be maintained while the speed of the motors is being changed, if torque to overcome the inertia of the reel and the armature 1 of the reel motor RM is supplied. Furthermore, since both motors are connected to the main generator MG while the drive motor DM has constant field excitation and the ratio of speeds between the motors is to be maintained, the additional torque must be obtained from changes in armature current in the reel motor RM. To produce these changes in armature current, the booster generator BG has a third field winding 42 that is energized only during changes in motor speed and then in the direction of the change. This third winding 42, in series with a resistor 43, is connected between a pair of leads 44 and 45 that are selectively connected to the control buses 12 and 13. The inertia compensating field winding IF of the control generator CG, in series with a resistor 46, is also connected between the leads 44 and 45.

When the speed of the reel and drive motors DM and RM is to be increased an "accelerate" pushbutton switch 47 is operated. This switch 47 has a first set of contacts 48 that complete a circuit from the positive control bus 12, through a forward field winding 49 and armature 50 of the speed changer motor 20 to the negative control bus 13. The motor 20, thus energized, drives the field rheostat of the main generator MG in the direction to increase the excitation of the generator and thus the speed of the system.

The switch 47 has a second set of contacts 51 serving to connect the positive control bus 12 to the lead 45 by way of a protective resistor 52. A third set of contacts 53 connect the lead 44 to the negative control bus 13. This circuit energizes the third field winding 42 of the booster generator to increase the armature current in the desired amount, and through the inertia compensating field winding IF calibrates the control generator CG for the increased armature current.

When the speed of the motors DM and RM is to be decreased, a "decelerate" pushbutton switch 54 is operated. This switch has a first set of contacts 55 for energizing the speed change motor 20 through its reverse field winding 56 so that the motor operates to reduce the excitation of the main generator MG. A second set of contacts 57 connect the lead 47 to the negative control bus 13, while a third set of contacts 58 and resistor 59 connect the lead 44 to the positive control bus 12. This last circuit energizes the booster generator field winding 42 to reduce the armature current of the motor RM and the inertia compensating field winding IF of the control generator to calibrate it for the lesser armature current.

The operator's control panel includes the tension adjusting rheostats, the maximum speed rheostat, the "accelerate" and "decelerate" pushbuttons, and the controls for the alternating current motors. To put the system in operation, assuming the generators are running and the speed change motor 20 has reduced the main generator excitation to zero, the tension rheostat is set according to the tension to be maintained in the material being processed. Then the "accelerate" pushbutton 47 is depressed until the drive motor turns slowly and draws material from the processing equipment. The speed of the reel motor RM is then adjusted by operation of the rheostat 26.

The minimum (all-out) resistance of rheostat 26 should be of such a value that the constant-voltage buses 12, 13 supply full-field current to the motor field winding 2. The maximum (all-in) resistance of rheostat 26 should be such that a weak-field current is maintained in the motor field winding 2. Then the rheostat 26 can be used by the operator to adjust the speed of the reel motor over the entire available range between weak-field speed to full-field speed.

Suppose that the drive is operating and that, after the reel has built up to some intermediate diameter, a break occurs in the material being wound. The control generator CG will allow the reel to speed up to the weakfield speed, and it may be impossible to get the material to take hold on the periphery of the fast-running partially-filled reel. Then the operator can adjust the rheostat 26 to lower speed thus slowing down the reel until its periphery is only slightly faster than the linear speed of the material being wound. The material can then be more easily started on the reel. Thereafter, as the reel builds up from the intermediate diameter to full reel, the control generator takes over the task of adjusting the motor field proportionally to the increasing reel diameter without readjustment of rheostat 26. Of course, rheostat 26 must be returned to the "all-in" position before the start of a new empty reel.

It will be recognized that the control according to the invention is exercised on a standard direct-current motor by providing two sources of field current for the motor. The first source has constant voltage and is connected to the motor field winding in series with a resistor (rheostat 26). This source establishes a minimum field current corresponding to the maximum allowable speed of the motor. The second source, represented by the control generator CG has variable voltage and is series-connected with a rectifier across the motor field winding so that the second source and the rectifier lie in series with the just-mentioned resistor across the constant-voltage source, and increases the field current to maintain a selected power output as long as the selected power can be absorbed in the load.

Since the control operates by regulating the field current in a single field winding of a conventional motor, the equipment is inexpensive and simple to construct.

Various modifications in details of the control may be made without departing from the spirit and scope of the invention.

We claim as our invention:

1. An electric drive for substantially constant power output, comprising a variable speed motor having a field winding, a first direct-current source of substantially constant voltage and a resistor series-connected to said winding, a second direct-current source of variable voltage and rectifier means connected in series with each other across said winding to aid said first source in supplying field current, and means for controlling said second source according to the armature current of the motor.

2. An electric drive, comprising a direct-current motor having a field winding, a source of substantially constant voltage and an adjustable resistor series-connected to said field winding for supplying field current thereto, means for comparing the armature current of the motor with a reference current selected according to the power to be maintained, a variable-voltage source controlled by said means, and rectifier means series-connected with said variable-voltage source across said field winding and poled to permit said variable-voltage source to aid said constant-voltage source in supplying field current for said winding.

3. In a control system for maintaining constant power output of a direct-current motor as the speed is varied by load conditions, in combination, a field winding in the motor, a constant-voltage source and a resistor series-connected to said field winding, a control generator connected across said field winding and having means for energizing the control generator according to the armature current of the motor, and valve means series-connected with said control generator.

4. An electric drive, comprising a drive motor having an armature and a field winding, current supply means connected to said armature to provide it with energizing current, a first source of substantially constant voltage, a resistance member connected in series with said field winding across said first source, a second voltage source having an output circuit of variable voltage and having a control circuit connected with said current supply means for controlling said variable voltage in dependence upon said current, said output circuit being connected across said field winding and a rectifier series-connected in said output circuit and poled to start conducting current and thereby varying the excitation of said field member only when said variable voltage passes through a given magnitude of a given polarity.

5. An electric drive, comprising a drive motor having an armature and a field winding, current supply means connected to said armature to provide it with energizing current, a first source of substantially constant voltage, a resistance member connected in series with said field winding across said first source, a second voltage source having an output circuit of variable voltage and having a control circuit connected with said current supply means for controlling said variable voltage in dependence upon said current, a rectifier, said output circuit and said rectifier being connected in series with each other across said field winding and poled to pass current through said field winding in the direction of the current from said source for strengthening the excitation of said field winding when said variable voltage exceeds a given magnitude.

6. A variable-voltage drive, comprising a main generator and a motor having a common armature circuit, said motor having a field winding, constant-voltage leads, a resistor connected in series with said field winding across said constant-voltage leads, a regulating generator having an armature circuit for providing control voltage and having a control field winding connected with said armature circuit for varying said control voltage in dependence upon an electric operating magnitude of said motor, a rectifier connected in series with said armature across said motor field winding and poled to pass current through said field winding in the direction of the current from said constant-voltage circuit for strengthening the excitation of said field when said control voltage exceeds a given magnitude.

MARTIN H. FISHER.
VINCENT B. BAKER.

REFERENCES CITED

The following references are of record in the file of this patent:

UNITED STATES PATENTS

| Number | Name | Date |
|---|---|---|
| 2,305,937 | Montgomery et al. | Dec. 22, 1942 |
| 2,447,654 | Kenyon | Aug. 24, 1948 |